United States Patent
Curry

(10) Patent No.: US 9,053,135 B2
(45) Date of Patent: Jun. 9, 2015

(54) DEVICE LEVEL PERFORMANCE MONITORING AND ANALYSIS

(75) Inventor: Stephen M. Curry, Holly Springs, NC (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1029 days.

(21) Appl. No.: 11/955,771

(22) Filed: Dec. 13, 2007

(65) Prior Publication Data

US 2009/0157674 A1    Jun. 18, 2009

(51) Int. Cl.
*G06F 17/30* (2006.01)

(52) U.S. Cl.
CPC .............................. *G06F 17/30306* (2013.01)

(58) Field of Classification Search
USPC .......... 709/204, 220–229, 246, 200; 370/270, 370/465, 477, 351–358, 408, 60; 348/211–215, 207; 705/1–5; 725/34–45, 80–101
See application file for complete search history.

(56) References Cited

U.S. PATENT DOCUMENTS

| | | | | |
|---|---|---|---|---|
| 6,119,164 A * | 9/2000 | Basche | ........................ | 709/229 |
| 7,017,071 B2 * | 3/2006 | Katayama et al. | ............. | 714/4.4 |
| 7,062,549 B1 * | 6/2006 | Miller et al. | ................... | 709/223 |
| 7,260,597 B1 * | 8/2007 | Hofrichter et al. | ............ | 709/200 |
| 7,451,210 B2 * | 11/2008 | Gupta et al. | ................... | 709/224 |
| 7,487,408 B2 * | 2/2009 | Echeverria et al. | ............. | 714/57 |
| 7,516,438 B1 * | 4/2009 | Leonard et al. | ................ | 717/102 |
| 7,895,323 B2 * | 2/2011 | Gupta et al. | ................... | 709/224 |
| 8,019,849 B1 * | 9/2011 | Lopilato et al. | ............... | 709/223 |
| 2005/0021744 A1 * | 1/2005 | Haitsuka et al. | .............. | 709/224 |
| 2006/0023642 A1 * | 2/2006 | Roskowski et al. | ........... | 370/254 |
| 2006/0259604 A1 * | 11/2006 | Kotchavi et al. | .............. | 709/223 |
| 2007/0192065 A1 * | 8/2007 | Riggs et al. | .................... | 702/189 |
| 2009/0138239 A1 * | 5/2009 | Golani et al. | ................. | 702/186 |

FOREIGN PATENT DOCUMENTS

| WO | WO 0039978 | * | 7/2000 | ............. H04L 29/00 |
|---|---|---|---|---|
| WO | WO02/006967 | * | 7/2001 | ............. G06F 15/16 |

* cited by examiner

*Primary Examiner* — Anthony Mejia

(57) ABSTRACT

Methods relating to device level performance monitoring and analysis include accessing device data including a listing of network devices, with each network device having a device profile. The methods further include accessing service reports, with each report related to a service issue. A set of devices profiles from the listing of network devices may be identified based on a particular device being associated with a particular service issue. The method further includes determining a set of problem prone device profiles from the set of devices profiles. A system including at least one database and a report processor may be configured to associate device data with service reports, identify service issue trends from service reports, identify at least one at risk device susceptible to future service issues related to service issue trends, and provide preventative support to the identified at least one at risk device.

17 Claims, 7 Drawing Sheets

DEVICE LEVEL PERFORMANCE MONITORING AND ANALYSIS

BACKGROUND

A service provider may implement a tracking system for tracking reports of service issues and customer service requests. Such a tracking system may provide historical information related to service issues, but may not provide predictive analyses regarding future service issues. Moreover, such issue tracking systems only include limited information on the network devices that were subject to the service issues. Having only limited information on the network devices prevents the extrapolation of past service issues for the prediction of future service issues that may occur in similar devices.

A customer relationship database system may track information related to a set of customers. This customer information may include details regarding the network devices of the customer. However, information that is obtainable only from a combination of issue tracking and customer relationship data sets may go unrealized absent systems and methods for joining and analyzing data from such disparate systems.

DETAILED DESCRIPTION

Figure 1:
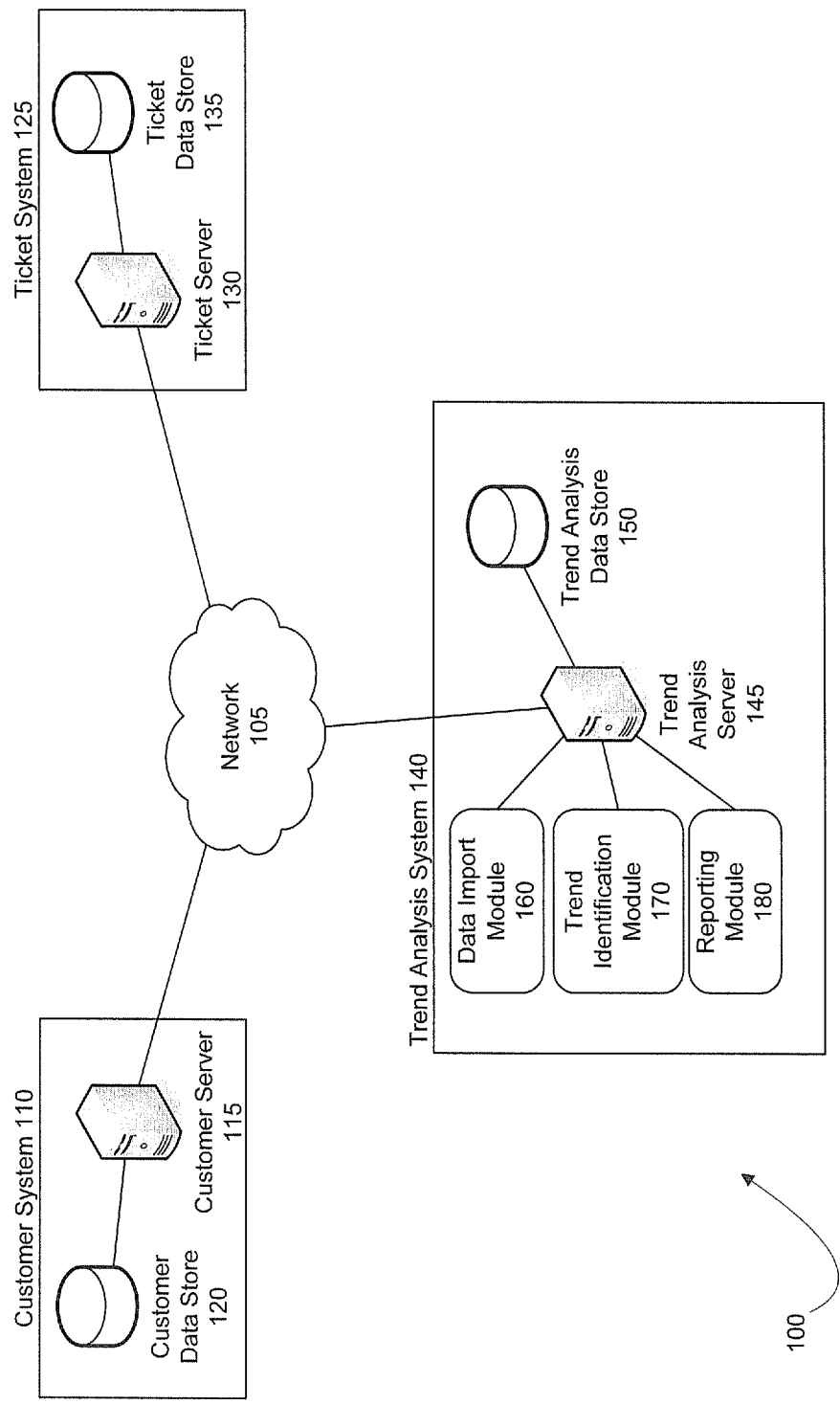
FIG. 1 illustrates an exemplary device level performance monitoring and analysis system.

FIG. 1 illustrates an exemplary device level performance monitoring and analysis system 100. System 100 may be implemented by a service provider such as a network service provider. A network 105 may interconnect a customer system 110, a ticket system 125, and a trend analysis system 140. Customer system 110 may include a customer server 115 communicatively coupled to a customer data store 120. Ticket system may include a ticket server 130 communicatively coupled to a ticket data store 135. Trend analysis system 140 may include a trend analysis server 145 communicatively coupled to a trend analysis data store 150. Trend analysis server may include a data import module 160, a trend identification module 170, and a reporting module 180.

Network 105 may be a local-area network (LAN) or a wide-area network (WAN). Network 105 may further be a packet switched communication network such as an Internet Protocol (IP) network. Network 105 generally interconnects various computing devices and the like, such as servers 115, 130, and 145. Interconnections in network 105 may be made by various media including wires, radio frequency transmissions, and optical cables. Other devices connecting to network 105, e.g. switches, routers, etc., are omitted for simplicity of illustration in FIG. 1.

Customer system 110 may provide a customer server 115 and customer data store 120 for tracking information about customers. Customer system 110 may be a customer relationship management system, or the like. Any one of numerous generally available customer relationship management systems, e.g., SAP CRM, Oracle/Sieble CRM, Salesforce, etc., may be suitable as customer system 110. Customer system 110 may include data storage entities in customer data store 120 that are particularly adapted or customized to the relationship between the service provider and the customer. For instance, a network service provider may include data storage entities for storing information about network devices, device interfaces, and circuits associated with a customer.

Customer server 115 may be a server based computer system, such as a web application server, configured to provide a customer relationship management system like that just described. However, any computing device having a computer readable medium including instructions for communicating with customer data store 120 may act as customer server 115. Customer server 115 may be a networked computer system configured with server software for accepting connections via network 105. Customer server 115 may provide a graphical or command line user interface for use by a human operator. Additionally, customer server 115 may provide an interface of remote procedure calls that allow remote systems to programmatically interact with customer server 115. For instance, remote procedure calls may be used by trend analysis server 145 to receive data from customer data store 120. Accordingly, customer server 115 may act as an intermediary to customer data store 120. While FIG. 1 merely depicts a single customer server 115, it is to be understood that customer server 115 may include a pool of servers configured to share the responsibility of interacting with customer data store 120.

Customer data store 120 may be a relational database management system (RDBMS). Many such systems, including SQL Server, Oracle, and MySQL, among others, are generally available. Customer data store 120 generally stores customer data in row and column table format, and may include multiple tables. A row, or record, includes one or more columns, or fields, holding data values for specifically defined fields. Rows may be uniquely identified by the values of one or more columns. Indexes of one or more columns can be included to aide in searching for particular rows of the table.

Ticket system 125 may be provided by a customer service or helpdesk entity of the service provider. Such an entity may employ one of many generally available helpdesk management systems, e.g. Remedy, Kaseya, OneOrZero, etc. Such systems typically allow customer service personnel to receive service reports 410 (FIG. 4) related to service issues from customers. These reports 410 may be stored to a database, e.g. ticket data store 135, for use by other customer service personnel such as repair technicians. Such systems typically refer to stored service reports 410 as trouble tickets, or just tickets. A ticket may be initiated by customer service personnel or by a customer in response to a service issue faced by the customer. The customer service personnel may provide further information and prepare the ticket for a repair technician. The repair technician may provide follow-up information on the ticket regarding any repairs related to the service issue as well as the amount of time required to resolve the service issue.

Ticket server 130 may be a server based computer system, such as a web application server, configured to provide a helpdesk management system or ticket system like the one just described. However, any computing device having a computer readable medium including instructions for communicating with ticket data store 135 may act as ticket server 130. Ticket server 130 may be a networked computer system configured with server software for accepting connections via network 105. Ticket server 130 may provide a graphical or command line user interface for use by a human operator. Additionally, ticket server 130 may provide an interface of remote procedure calls that allow remote systems to interact with ticket server 130. For instance, remote procedure calls may be used by trend analysis server 145 to receive data from ticket data store 135. Accordingly, ticket server 130 may act as an intermediary to ticket data store 135.

Ticket data store 135 may be a relational database management system (RDBMS). Many such systems, including SQL Server, Oracle, and MySQL, among others, are generally available. Ticket data store 135 generally stores ticket data in row and column table format, and may include multiple tables. A row, or record, includes one or more columns, or fields, holding data values for specifically defined fields. Rows may be uniquely identified by the values of one or more columns. Indexes of one or more columns can be included to aide in searching for particular rows of the table.

Trend analysis system 140 may include trend analysis server 145 and trend analysis data store 150 in order to receive data from customer data store 120 and ticket data store 135. Customer and ticket data may be copied to trend analysis system in order to allow manipulations and alterations thereof without causing interference to the normal operations of the originating systems. For instance, ticket data may need to be altered by trend analysis server 145. However, altering the ticket in ticket data store 135 may interfere with the normal operations of ticket system 125. Trend analysis system 140 may store the customer and ticket data according to a different table structure, e.g., a structure that is simplified or optimized for the identification of service issue trends. Accordingly, trend analysis data store 150 may maintain a duplicate set of client and ticket data in order to allow for any necessary manipulations and alterations. While FIG. 1 merely depicts a single trend analysis server 145 and a single trend analysis data store 150, it is to be understood that trend analysis system 140 may include a pool of trend analysis servers 145 and trend analysis data stores 150.

Trend analysis server 145 may be a server based computer system, such as a web application server, configured to provide data import, trend identification, and reporting functionality. However, any computing device having a computer readable medium including instructions for modules 160-180 may act as trend analysis server 145. Trend analysis server 145 may be a networked computer system configured with server software for accepting connections via network 105. Trend analysis server 145 may provide a graphical or command line user interface for use by a human operator. Additionally, trend analysis server 145 may provide an interface of remote procedure calls, or the like, that allow remote systems to interact with trend analysis server 145. For instance, remote procedure calls may allow for the remote execution of modules 160-180.

Trend analysis data store 150 may be a relational database management system (RDBMS). Many such systems, including SQL Server, Oracle, and MySQL, among others, are generally available. Trend analysis data store 150 generally stores customer and ticket data in row and column table format, and may include multiple tables. A row, or record, includes one or more columns, or fields, holding data values for specifically defined fields. Rows may be uniquely identified by the values of one or more columns. Indexes of one or more columns can be included to aide in searching for particular rows of the table.

Figure 6:
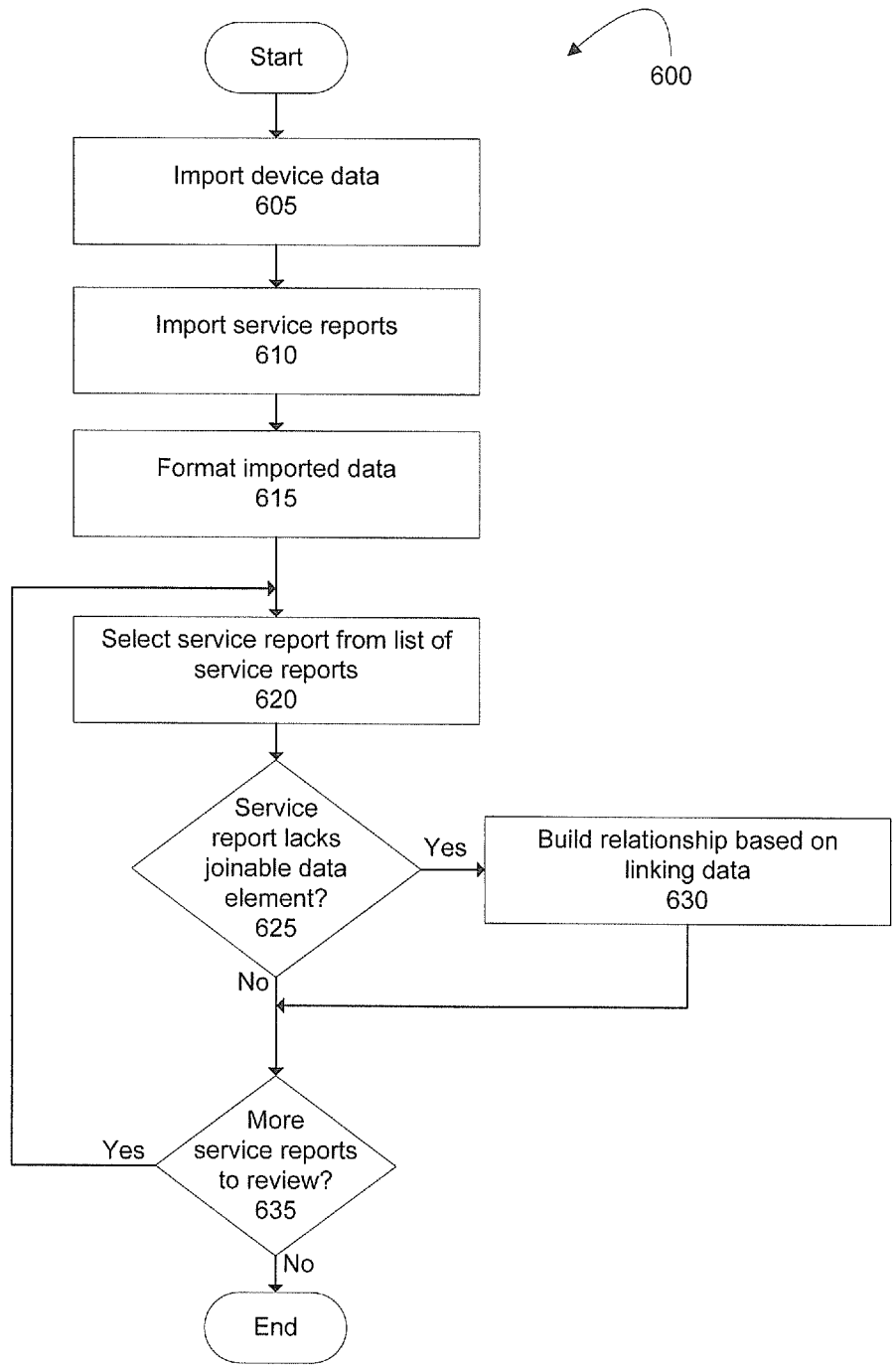
FIG. 6 illustrates a flowchart depicting exemplary steps and decisions relating to a process for importing data.

Data import module 160 may provide computer instructions for interacting with customer system 110 and ticket system 125 in order to receive data from customer data store 120 and ticket data store 135. The instructions of data import module 160 may be executed manually via the interface of trend analysis server 145. For instance, trend analysis server 145 may provide a web page interface, or the like, that includes controls for executing data import module 160. Trend analysis server 145 may further provide an interface for scheduling the execution of data import module 160 at a future time or on a recurring, periodic basis. In another exemplary approach, data import module 160 may run continuously and may receive data from customer data store 120 and ticket data store 135 via various data acquisition methodologies. Data import module 160 is described in more detail below with respect to FIGS. 4 and 6.

Trend identification module 170 may provide computer instructions for analyzing the data imported by data import module 160 in order to identify service issue trends from the ticket data. The instructions of trend identification module 170 may be executed manually via the interface of trend analysis server 145. In another exemplary approach, trend identification module 170 may be called or triggered by the execution of data import module 160. Trend identification module 170 is described in more detail below with respect to FIGS. 5 and 7.

Reporting module 180 may provide computer instructions for analyzing the service issue trends identified by trend identification module 170. The instructions of reporting module 180 may be executed manually via the interface of trend analysis server 145. In another exemplary approach, reporting module 180 may be called or triggered by the execution of trend identification module 170. Reports may be provided in electronic form such as a web page, email, PDF document, etc. Reporting module 180 is described in more detail below with respect to FIGS. 5 and 6b.

Figure 2:
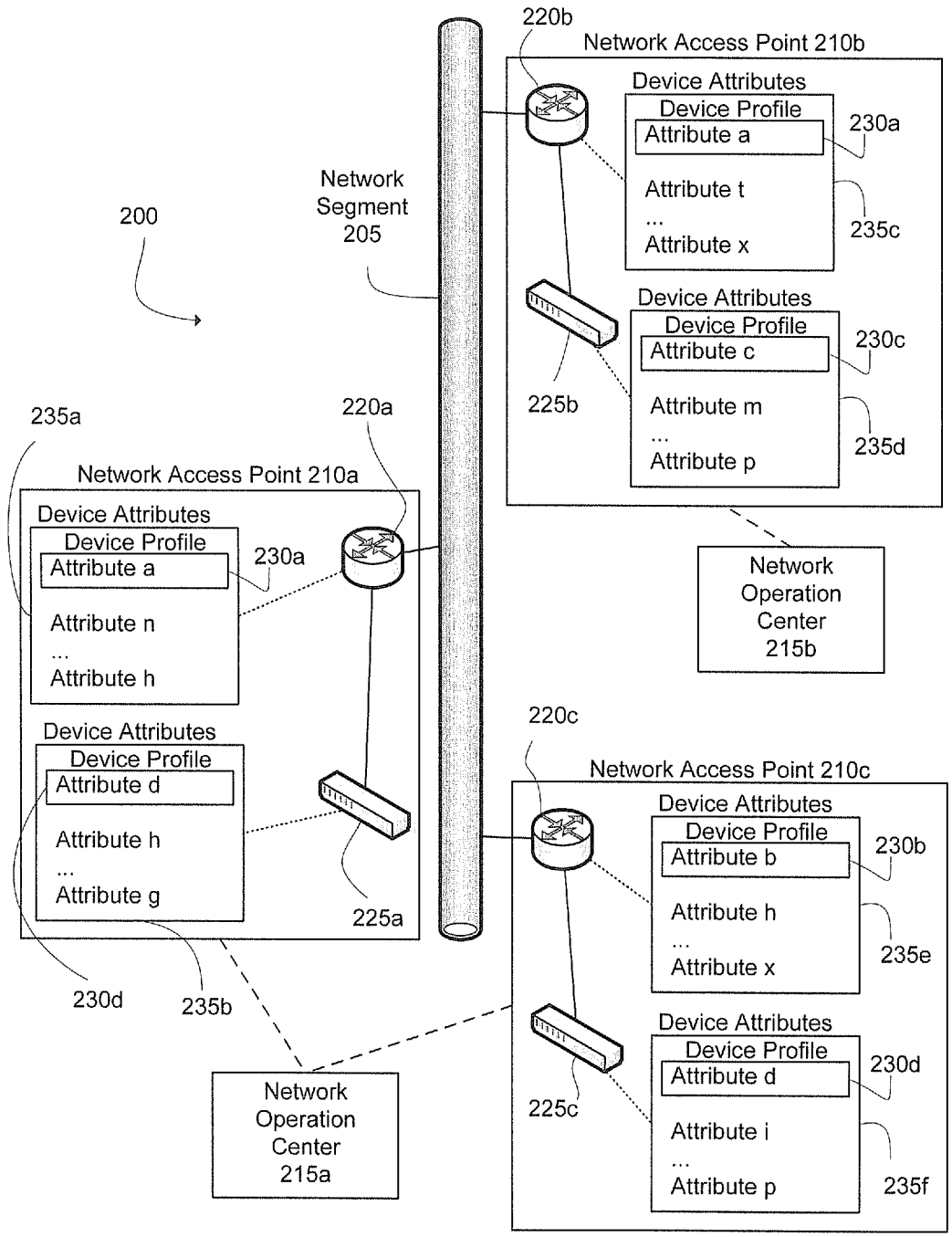
FIG. 2 illustrates an exemplary telecommunications network including network devices with various device profiles and device attributes.

FIG. 2 illustrates a portion of exemplary telecommunications network 200. A network segment 205 may interconnect various network access points 210a-c. Each network access point 210a-c may be monitored by a network operations center (NOC) 215a-b. Network access points 210a-c may host network devices such as routers 220a-c and switches 225a-c. Network devices generally have a device profile 230a-d as well as a set of device attributes 235a-f.

Network segment 205 may be a high capacity network connection, such as a network backbone, which carries data gathered from smaller connections that interconnect with it. However, it is to be understood that network segment 205 might not be a single element as depicted. For instance, network segment 205 may include one or more discrete networks that are not necessarily directly attached to each other.

Network access points 210a-c provide access to network segment 205 and may provide a physical co-location point for hosting various network devices such as routers 220a-c and switches 225a-c. NOC 215a-b may include a facility, equipment, and personnel for monitoring and maintaining the network connections and network devices of network access points 210a-c. A single NOC, e.g., NOC 215a, may be responsible for monitoring multiple network access points 210a, 210c. NOCs 215a-b may be physically co-located with network access points 210a-c, or may be in geographically remote locations. Additionally, NOC 215a may not be responsible for monitoring all network devices at network access point 210a, but may be responsible for a subset of network devices at a multiple network access points 210a, 201c.

Routers 220a-c act as connection points or nodes to network segment 205. Routers 220a-c generally provide connections to one or more networks 205 in order to direct network communications between network devices. However, connections from routers 220a-c to other routers or networks are omitted from FIG. 2 for simplicity. Routers 220a-c may provide connections to other network devices at network access point 210a-c such as switches 225a-c. Switches 225a-c generally distribute a network connection to multiple network devices (not show). It is to be understood that network devices are not limited to the illustrated routers 220a-c and switches 225a-c and may also include both low level equipment such as digital subscriber line access multipliers (DSLAMs), digital subscriber line (DSL) modems, channel service units/data service units, and high level equipment such as firewalls, instruction detection systems, traffic monitoring systems, etc. Other configurations of exemplary telecommunications network 200 are also possible including providing the functions of routers 220a-c and switches 225a-c by the same physical device. Additionally, other network devices such as firewalls and intrusion detection systems may be included as part of switches 225a-c.

Each network device, i.e. routers 220a-c and switches 225a-c, may include a device profile 230a-e and device attributes 235a-f. A device profile 230a-d may be defined by at least one device attribute 235a-f. Moreover, two devices may share the same device profile 230a-d despite having a different set of device attributes 235a-f. For instance, a device profile 230a-d may be defined by the manufacture and model number of a network device. While the manufacture and model number may also be device attributes 235a-f, the device attributes 235a-f may further include additional information such as the operating system name and version, the firmware version, etc. Furthermore, aspects external to a network device may also be included as device attributes 235a-f. For instance, the circuit transport type of a device, the customer, and even the NOC 210a-c responsible for monitoring the network device may all be considered as being part of the set of device attributes 235a-f.

Computing devices such as customer server 115, ticket server 130, and trend analysis server 145 may employ any of a number of computer operating systems known to those skilled in the art, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Computing devices may include any one of a number of computing devices known to those skilled in the art, including, without limitation, a computer workstation, a desktop, notebook, laptop, or handheld computer, or some other computing device known to those skilled in the art.

Computing devices such as customer server 115, ticket server 130, and trend analysis server 145, etc., may each include instructions executable by one or more computing devices such as those listed above. Computer-executable instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media, Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Customer data store 120, ticket data store 135, and trend analysis data store 145 may include a query processor that employs Structured Query Language (SQL) in addition to a language for creating, storing, editing, and executing stored procedures, such as the Procedural Language/Structured Query Language (PL/SQL) utilized by Oracle, as mentioned above. Customer data store 120, ticket data store 135, and trend analysis data store 145 may each be some other kind of database, other than an RDBMS, such as a hierarchical database, a set of files, an embedded application database in a proprietary format, etc. Customer data store 120, ticket data store 135, and trend analysis data store 145 generally include a computing device employing a computer operating system such as one of those mentioned above, and are accessed via a network in any one or more of a variety of manners, as is well known. Exemplary systems are possible in which customer data store 120, ticket data store 135, and trend analysis data store 145, or a combination thereof, are combined as a single data store.

Figure 3:
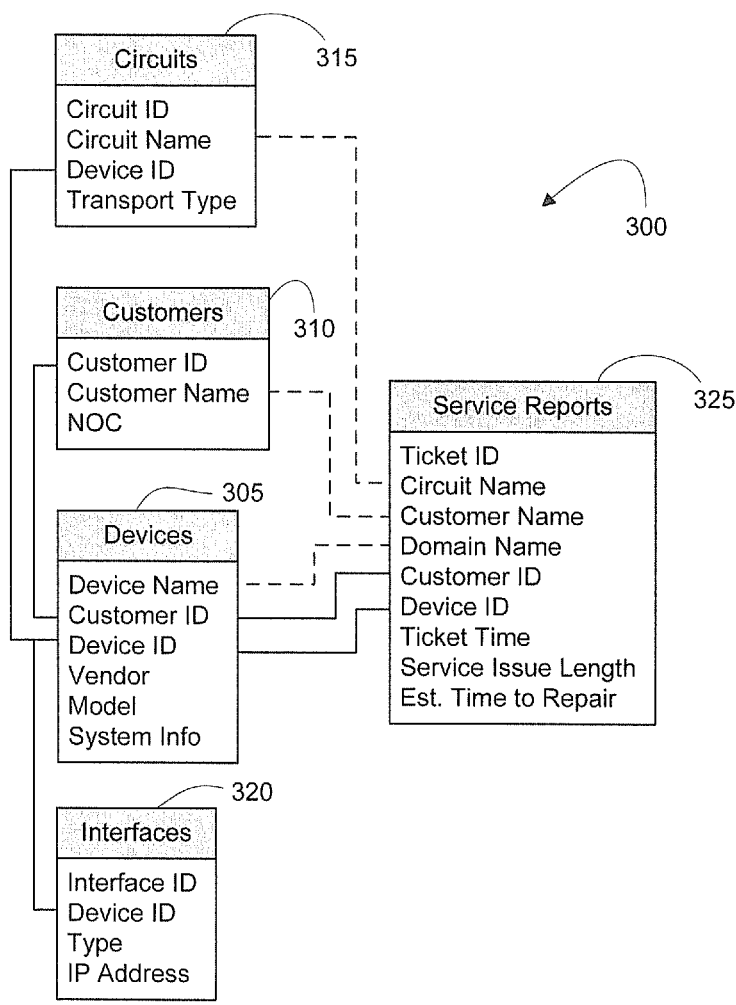
FIG. 3 illustrates an exemplary set of database entities.

FIG. 3 illustrates an exemplary set of database entities, or tables, 300 that may be used with trend analysis data store 150. In one exemplary approach, data in a circuits table 315, a customers table 310, a devices table 305, and an interfaces table 320 may originate from customer data store 120. Similarly, data in a service reports table 325 may originate from ticket data store 135. Devices table 305 may include information about network devices, i.e., routers 220a-c and switches 225a-c, including device profiles 230a-d and device attributes 235a-f. Device profiles 230a-d and device attributes 235a-f may include the fields, or columns, of devices table 305. However, fields from other tables such as circuits table 315, customers table 210, and interfaces table 320 may also be included as part of device profiles 230a-d and device attributes 235a-f. Service reports table 325 may include time values in the ticket time, service issue length, and estimated time to repair fields.

As discussed above, relational databases typically store data in tabular row and column format. A relationship may be provided, for example, from a row of a first table to a row of a second table by including a value that identifies the row of the second table in the row of the first table. The dashed lines FIG. 3 illustrate the corresponding fields that may be used to develop relationships between devices table 305 and service reports table 325. The solid lines of FIG. 3 represent existing relationships including those developed between devices table 305 and service reports table 325 by data import module 160.

Figure 4:
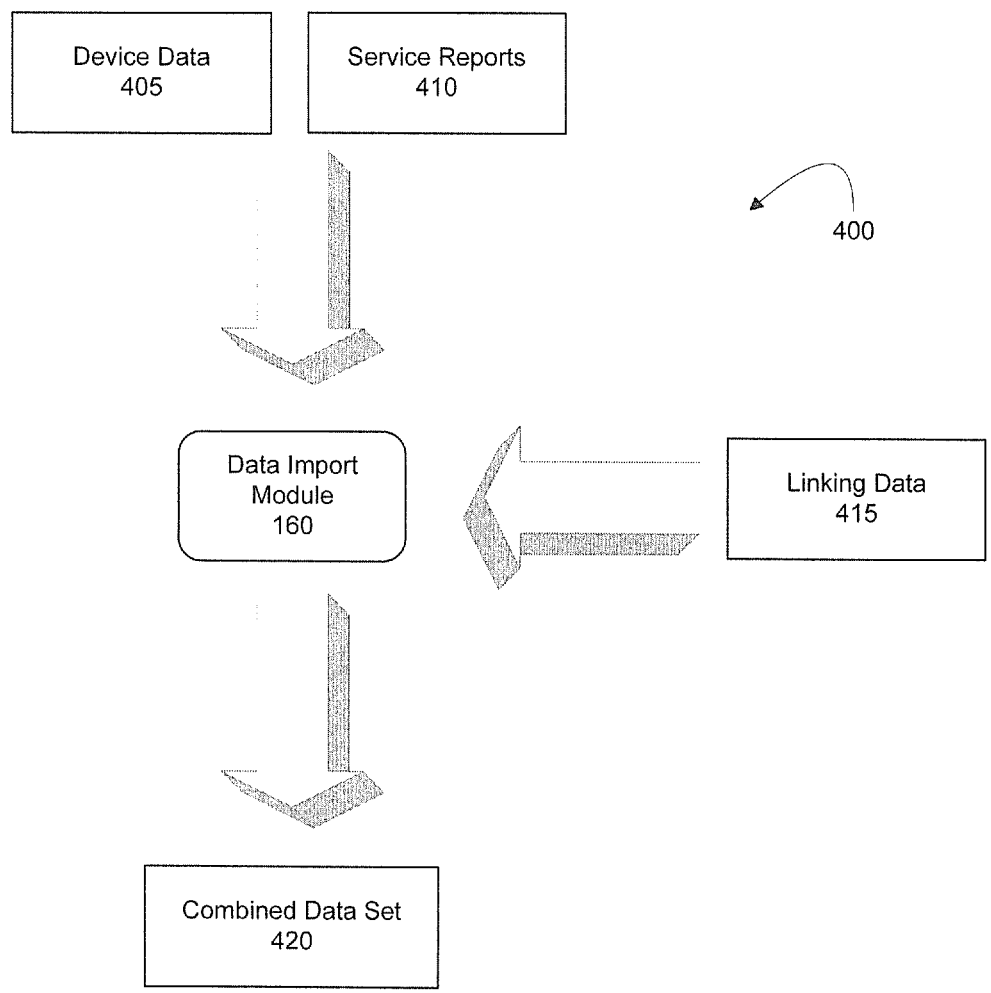
FIG. 4 illustrates an exemplary dataflow diagram for a data import module.

FIG. 4 provides a dataflow diagram illustrating an exemplary flow 400 of data into and out of data import module 160. Device data 405 may include a listing of network devices including a device profile for each device, and may include data that will be imported in to devices table 305. Service reports 410 may include reports of service issues such as the service issues that are stored as tickets in ticket system 125 and imported into service reports table 325. A service issue may be the result of numerous possible causes, including an issue with a network device. However, service reports 410 may not be configured to relate a service issue to a network device. For example, a network service provider may experience service issues as the result of a problematic network device, but may only be able to record service reports 410 according to a particular network circuit, customer, or domain name. Accordingly, service reports 410 may be analyzed with respect to linking data 415 in order to relate a service report 410 to a particular network device of device data 405.

As discussed above, data import module 160 may be provided when the data required by trend analysis module 170 is not available in trend analysis data store 150. Accordingly, data import module 160 may receive data from customer data store 120 and ticket data store 135. However, service reports 410 from ticket data store 135 may lack attributes allowing for the joining of the data with the data from customer data store 120. For instance, a telecommunications service provider may implement ticket system 125 such that each service report 410 is related to a network circuit rather than to a customer or network device. Moreover, service reports 410 may not include any device information or may only include a secondary device identifier, such as a domain name. Therefore, customer data and circuit data from customer data store 120 may be provided to data import module 160 and used as linking data 415 to form relationships between device data 405 and service reports 410, such as ticket data. As discussed above, importing data into trend analysis data store 150 may allow for data alterations and manipulations that wouldn't be possible in the source data stores.

As will be discussed in more detail below with respect to FIG. 6a, data import module 160 may receive data from customer data store 120 and ticket data store 135. The data may then be formatted or altered in order to facilitate comparisons between the previously disparate data sets. Finally, service reports 410 may be iteratively reviewed to identify relationships to device data 405. Data import module 160 may produce a combined data set 420 of device data 405 and service reports 410.

Figure 5:
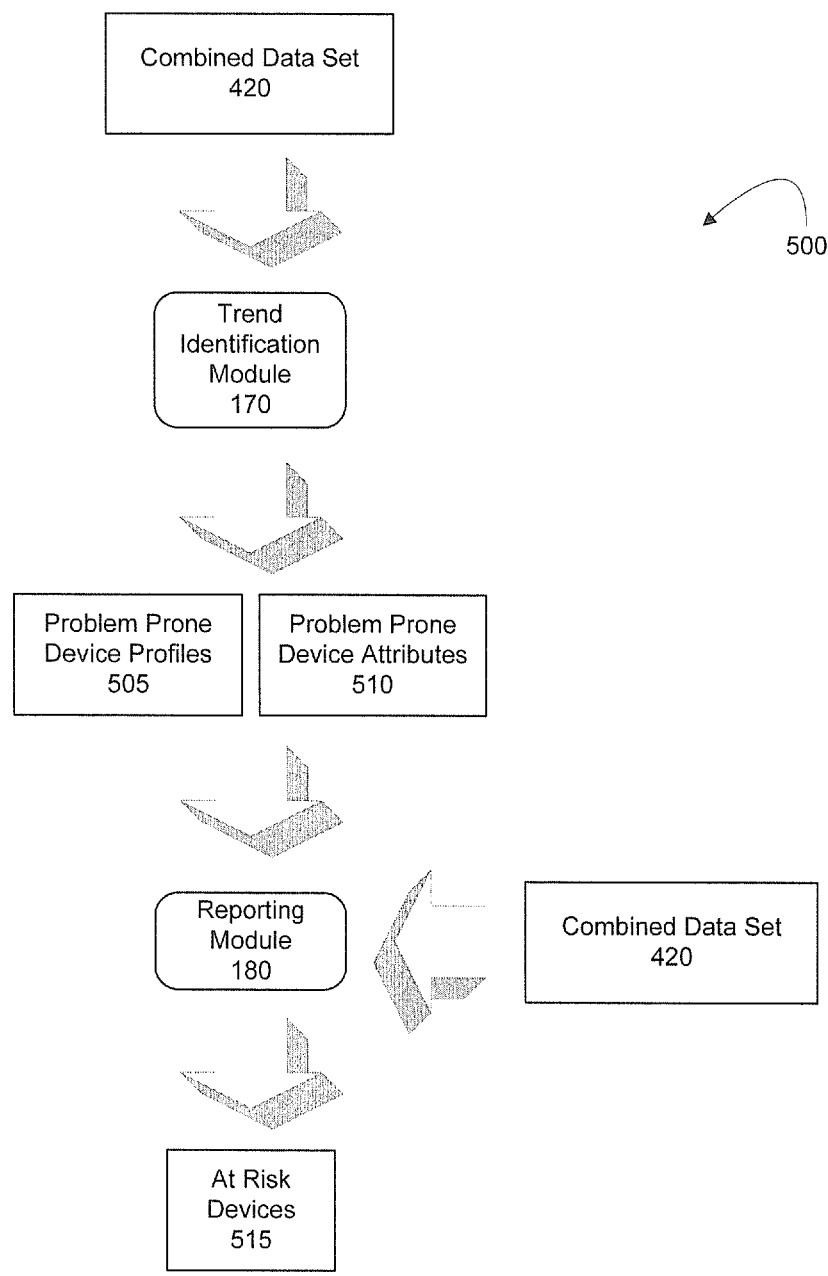
FIG. 5 illustrates an exemplary dataflow diagram for a trend identification module and a reporting module.

FIG. 5 provides a dataflow diagram illustrating an exemplary flow 500 of data into and out of trend identification module 170 and reporting module 180. Combined data set 420, such as that produced by data import module 160, may be accessed and reviewed to identify a set of device profiles 230a-d related to service issues. This set of device profiles 230a-d may then be used to determine a set of problem prone device profiles 505 and problem prone device attributes 510. Combined data set 420 may then be reviewed again in light of problem prone device profiles 505 and problem prone device attributes 510 in order to identify at risk devices 515. Additional details of trend identification module 170 and reporting module 180 are presented below with respect to FIG. 6b.

A service issue trend may include any history of service issues that may be associated by some common aspect. For instance, a service issue trend may include a history of service issues that are all associated by a common a device profile 230a-d or device attribute 235a-f. A service issue trend may be predictive of future service issues even for devices that have never experienced a service issue.

In one exemplary approach, a device profile 230a-d may encompass a vender and model number of a device. It may be determined that a certain combination of the vender and model number is problem prone, and therefore the device profile 230a-d encompassing the vender and model number would be considered a problem prone device profile 505. This identification of a problem prone device profile 505 may provide a predictive indication that other devices, even those that have never experienced a service issue, may be at risk for a future service issue. However, just because a device profile 230a-d may be predictive of a future service issue does not necessarily indicate that the device profile 230a-d itself is the cause of the service issue. There may be other device attributes 235a-f that can be more closely correlated to service issues. For instance, it may be the case that many devices that share a problem prone device profile 505 also share a common device attribute 235a-f. This common device attribute 235a-f might be more predictive of a future service issue than the device profile 230a-d and therefore, may be identified as a problem prone device attribute 510. A search for at risk devices 515 that is limited to only those devices having a problem prone device profile would likely overlook a device having the identified problem prone device attribute 510 but that does not have the problem prone device profile 505.

FIG. 6a illustrates a flowchart depicting exemplary steps and decisions relating to a process 600 for importing device data 405 and linking data 415. Trend analysis server 145 may include a computer-readable medium having stored instructions for carrying out certain operations described herein, including some or all of the operations described with respect to process 600. For example, some or all of such instructions may be included in data import module 160.

The process 600 begins in step 605 in which device data 405 and linking data 415 may be imported. Trend analysis server 145 may connect to customer server 115 of customer system 110 in order to receive customer data, i.e. device data 405 and linking data 415, from customer data store 120. Trend analysis server 145 may utilize a remote procedure call available on customer server 115 in order to initiate the data import. In another exemplary approach, the data import may be initiated by customer server 115. For instance, trend analysis server 145 may be available to receive a transfer of customer data initiated by customer server 115. Regardless of the initiation of the data import, the customer data may be received by trend analysis server 145 in order to be saved to trend analysis data store 150. Because the customer data import may occur repeatedly, e.g., on a periodic basis, trend analysis data store 150 may already contain some or all of the data that is received from customer system 110. Accordingly, trend analysis server 145 may cause trend analysis data store 150 to overwrite all existing customer data or may compare the newly imported data to the existing data in order to save only the new or modified data. In another exemplary approach, customer server 115 may be configured to only provide data that is new or modified since last import of customer data.

Next, in step 610, service reports 410 may be imported. Service reports 410 may be related to service issues and may be derived from service repair requests such as the requests recorded by ticket system 125 and stored in ticket data store 135. The import of service reports 410 may be triggered by the conclusion of the import of customer data, i.e. device data 405 and linking data 415. Trend analysis server 145 may connect to ticket server 130 of ticket system 125 in order to receive service reports 410 from ticket data store 130. Trend analysis server 145 may utilize a remote procedure call available on ticket server 130 in order to initiate the data import. In another exemplary approach, trend analysis server 145 may be continuously available to receive data 410 from ticket system 125, Regardless of the initiation of the data import, the service reports 410 may be received by trend analysis server 145 in order to be saved to trend analysis data store 150. Because the import of service reports 410 may occur repeatedly, e.g., on a periodic basis, trend analysis data store 150 may already contain some or all of the data that is received from ticket system 125. Accordingly, trend analysis server 145 may compare the newly imported data to the existing data in order to save only the new data. In another exemplary approach, ticket server 130 may be configured to only provide data that is new or modified since last import of service reports 410.

Next, in step 615, the imported data, i.e. device data 405, service reports 410, and linking data 415, may be formatted. Because data may be imported from disparate systems, e.g. customer system 110 and ticket system 125, the imported data may not be formatted consistently across the data sets. Such inconsistencies may interfere and even prevent the development of relationships between the service reports 410 and device data 405. For instance, data may need to be capitalized, trimmed, or otherwise altered in a manner consistent with the formalities of trend analysis data store 150.

Steps 620-635 create a combined data set 420 by developing relationships between the imported device data 405 and service reports 410. It is to be understood that the relationship development is not limited to only the data that was just imported in steps 605 and 610. For instance, data that was previously imported may have failed to relate to any other data. However, new linking data 415 may have been imported in step 605 that would allow a relationship to be developed between the device data 405 and service reports 410.

Next, in step 620, a list of service reports 410 is retrieved from trend analysis data store 150. Step 620 begins the iteration of steps 620-635 over the list of service reports 410 by selecting a service report 410 for review. The selection typically involves a sequential selection of service reports 410. However, in another exemplary approach, the query processor of trend analysis data store 150 may provide only those service reports that lack a joinable data element.

Next, in step 625, it is determined whether the service report 410 that is currently being reviewed lacks a joinable data element. Each service report 410 may be represented by a row in service reports table 325. Rows in service reports table 325 may include a relationship to devices table 305 by including a value in the device ID column. Accordingly, any row of the service reports table 325 that lacks a relationship, i.e. an entry in the device ID column of the row, to devices table 305 is deemed to lack a joinable data element. If the service report 410 already includes a joinable data element, the process may skip to step 635.

Next, in step 630, linking data 415 may be used to build a relationship between device data 405 and service reports 410. The service report 410 currently being reviewed may be analyzed to determine if any other column provides information that may be used to develop a relationship to a specific device. Other possible columns that may be used to identify a specific device include the circuit name and domain name columns. For instance, the circuit name column may provide a value that can be used to determine a device ID from the circuits table 315. Similarly, the domain name column may provide a value that can be used to determine a device ID from the devices table 305. A direct relationship between the rows of service reports table 325 and the rows of customers table 310 may also be desired. Accordingly, the customer name field of service reports table 325 may be compared to the customer name field of customers table 310 to determine a customer ID to store in service reports table 325.

Next, in step 635, it is determined whether there are more service reports 410 to review. If there are remaining service reports 410 to review, the process may return to step 620.

Following a determination in step 635 that there are no more service reports 410 to review, the process ends.

Figure 7:
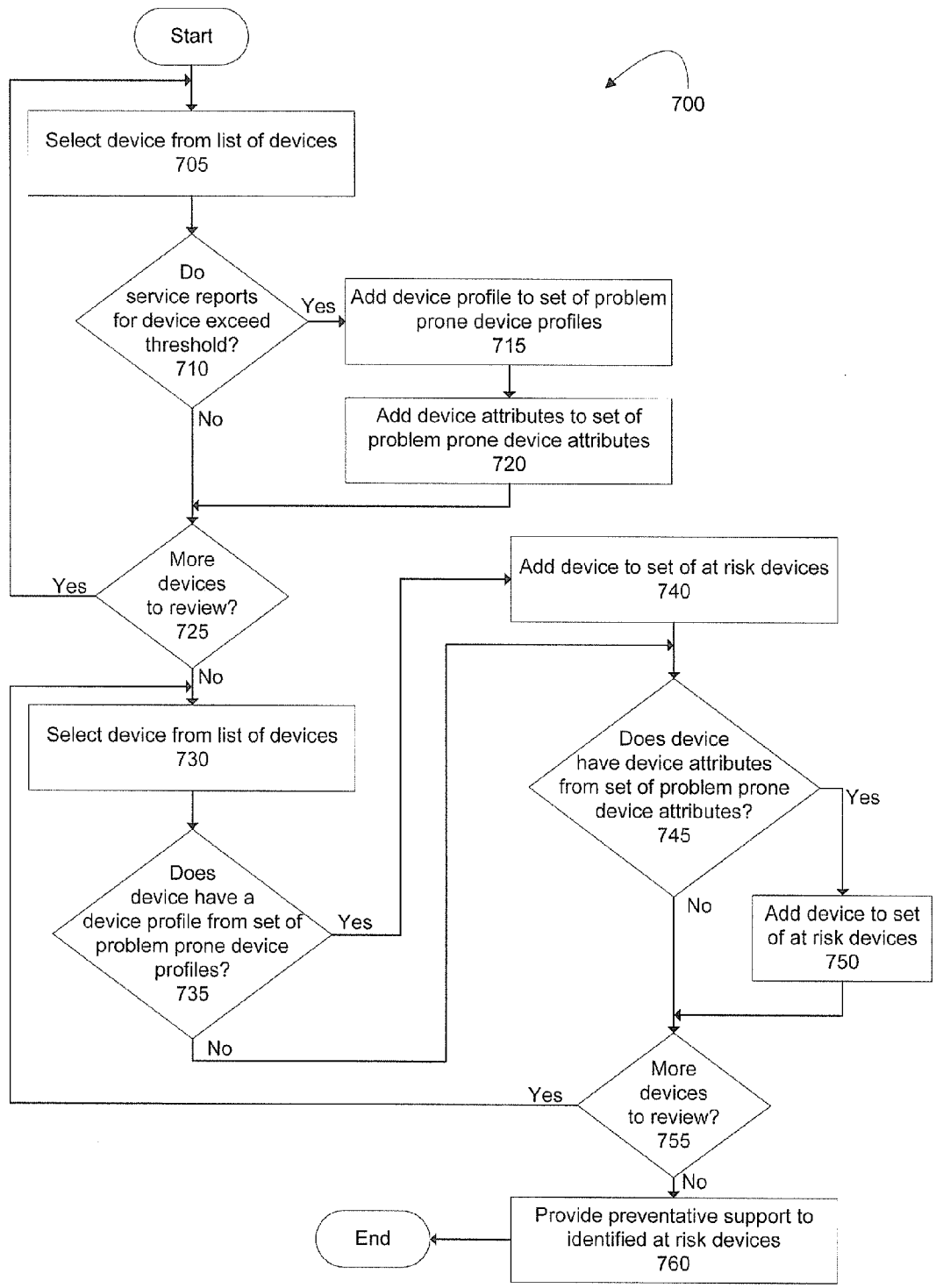
FIG. 7 illustrates a flowchart depicting exemplary steps and decisions relating to a process for identifying trends and at risk devices.

FIG. 7 illustrates a flowchart depicting exemplary steps and decisions relating to a process 700 for identifying service issue trends and at risk devices 515. Trend analysis server 145 may include a computer-readable medium having stored instructions for carrying out certain operations described herein, including some or all of the operations described with respect to process 700. For example, some or all of such instructions may be included in trend identification module 170 and reporting module 180. Process 700 involves two passes over a list of device records retrieved from devices table 305. The first pass identifies problem prone device profiles 505 and problem prone device attributes 510. The second pass reviews the list of devices in light of the identified problem prone device profiles 505 and problem prone device attributes 510 in order to identify a set of at risk devices 515.

The process 700 begins in step 705 in which a list of devices may be retrieved from trend analysis data store 150. As discussed above, service reports table 325 may provide service reports 410 associated with service issues. As a result of process 600, rows of service reports table 325 may include a device ID, thereby associating a particular device with a service report 410. Accordingly, service reports table 325 may be queried for all of the device IDs contained therein in order to identify a set of device IDs which represents devices that have experienced reported service issues in the past. A service provider may wish to identify the devices that have experienced service issues in order to identify trends in the service issues. However, merely identifying the devices may be insufficient. In fact, identifying the device profiles 230a-d associated with service issues may be more relevant to the prediction of future service issues. Accordingly, the set of device IDs may then be used to query the devices table 305 to retrieve a list of device records to examine.

Next, in step 710, it may be determined whether the service reports 410 for a device exceed a threshold. In order to improve the predictive results of the data, the entire list of devices associated with service issues may be narrowed. For instance, a device may be identified as a problem prone device based on the number of service reports 410 associated with the device exceeding a threshold level. The service reports table 325 may be queried for the number of service reports 410 associated with the device. If the count fails to exceed a threshold level, the process may proceed to step 725.

In another exemplary approach the threshold may be related to the length of single service issue or the sum of the lengths of the service issues associated with a device rather than simply the number of service reports 410 related to the device. The length of a service issue may be stored in the service issue length column of service reports table 325. Accordingly, for a threshold related to the sum of the lengths of the service issues, service reports 410 associated with a device may be retrieved in order to access the service issue lengths. The service issue lengths may then be summed and compared to the threshold.

Next, in step 715, the device profile 230a-d of the device may be added to the set of problem prone device profiles 505. As discussed in step 710, only those devices having service reports 410 that exceed a threshold will have their device profiles 230a-d added to the set of problem prone device profiles 505. Accordingly, the set of problem prone device profiles 505 may provide service issue trends by identifying those device profiles 230a-d have a history of service issues.

Next, in step 720, the device attributes 235a-f of the device may be added to the set of problem prone device attributes 510. A device profile 230a-d may be indicative of a future service issue, but might not be the actual cause. In fact, the cause of a service issue may be related to a device attribute 235a-f. As discussed above, a device attribute 235a-f that has a history of service issues may provide a service issue trend that can be used to predict future service issues. Therefore, the device attributes 235a-f of the device may be added to the set of problem prone device attributes 510.

Next, in step 725, the process may return to step 705 if there are remaining devices to review.

In another exemplary approach that takes advantage of a query processor of trend analysis data store 150, steps 705-725 may be condensed. For instance, service report data 410, i.e. the rows of service reports table 325, may be joined with the devices table 305 according the device ID column. The joined data may be grouped by device profile 230a-d and then counted. The selected device profiles 230a-d may be further limited to a set of problem prone device profiles 505, e.g., to only those having a count of related service issues exceeding a threshold or to only those related to service issues having a sum of the service issue lengths exceeding a threshold. A similar approach of using a query processor may be implemented to add device attributes 235a-f to the set of problem prone device attributes 510.

Next, in step 730, the second pass over the list of devices begins by selecting a device to review. Unlike above, the entire list of devices from devices table 305 may be reviewed in order to identify at risk devices 515, including those devices that have never experienced a service issue. At risk devices 515 include any device that has a device profile 230a-d included in the set of problem prone device profiles 510 or a device attribute 235a-f included in the set of problem prone device attributes 510. The problem history of a device, or lack thereof, may not be relevant to the determination that a device is an at risk device 515. Accordingly, a device that has never experienced a service issue may still be determined to be an at risk device 515 due to the device having a device profile 230a-d included in the set of problem prone device profiles 510 or a device attribute 235a-f included in the set of problem prone device attributes 510.

Next, in step 735, it is determined whether the device being reviewed has a device profile 230a-d that is included in the set of problem prone device profiles 505. The comparison of the device profile to the set of problem prone device profiles 505 may be conducted iteratively over the set of problem prone device profiles 505 or through the use of a query processor. If the device profile 230a-d is not included in the set of problem prone device profiles 505, the process may skip to step 745.

Next, in step 740, the device may be added to the set of at risk devices 515.

Next, in step 745, it is determined whether the device being reviewed has a device attribute 235a-f that is included in the set of problem prone device attributes 510. As with step 735, the comparison of the device attributes to the set of problem prone device attributes 510 may be conducted iteratively over the set of problem prone device attributes 510 or through the use of a query processor. If none of the device attributes 235a-f are included in the set of problem prone device attributes 510, the process may skip to step 755.

Next, in step 750, the device may be added to the set of at risk devices 515.

Next, in step 755, the process may return to step 730 if there are remaining devices to review.

Finally, in step 760, preventative support may be provided to the identified at risk devices 515. Multiple types of preventative support may be available based on the way a device was identified as being an at risk device 515. For a device identified based on the device profile 230a-d being in the set of problem prone device profile 505, a service technician could be assigned to provide general diagnostics, the device could be considered for replacement, or the vendor could be called upon to determine the cause of past service issues. For a device identified based on the device having a device attribute 235a-f from the set of problem prone device attributes 510, the preventative support may be targeted at the problem prone device attribute 510. For instance, if the problem prone device attribute 510 relates to the firmware or operating system of the device, appropriate upgrades or patches thereto could be applied. If the problem prone attribute 510 is related to the NOC 215a-b, the device could be assigned to a different NOC 215a-b, or the NOC personnel could receive training related to the device.

Following a determination in step 755 that there are no more devices to review, the process ends.

Accordingly, system 100 may allow a service provider to combine device data 405 from a customer system 110 with service reports 410 from a ticket system 125 in order to create a combined data set 420. The data may be imported by a data import module 160 into a separate trend analysis data store 150 in order to allow the data to be reformatted as necessary to identify relationships between the device data 405 and service reports 410. The combined data set 420 may relate information about service issues to particular devices such that a set of problem prone device profiles 505 and a set of problem prone device attributes 510 may be identified by a trend identification module 170. The combined data set 420 may be reanalyzed by a reporting module 180 to identify at risk devices 515 in order to provide preventative support thereto. Thus, customer service may be improved by providing support to at risk devices 515 prior to the development of a service issue.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain systems, and should in no way be construed so as to limit the claimed invention.

Accordingly, it is to be understood that the above description is intended to be illustrative and not restrictive. Many systems and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future systems. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites explicitly to the contrary.

What is claimed is:

1. A method comprising:
    accessing device data received from a plurality of devices, the device data including a listing of network devices, each network device having a device profile;
    accessing service reports, each report related to a service issue;
    identifying a set of problem prone device profiles, each problem prone device profile representing common aspects of at least one network device associated with a particular service issue;
    determining, by a processing device, from the listing of network devices, an at risk network device based on a profile of the at risk device matching the common aspects of at least one device profile in the set of problem prone device profiles, wherein the at risk device has not reported the particular service issue;
    determining that the device data and the service reports lack a joinable data element;
    introducing at least one linking data set; and
    determining the associations between devices and service issues based on a comparison between the device data and the service reports using the at least one linking data set.

2. The method of claim 1, further comprising basing the identifying of the set of problem prone device profiles on a sum of the service issues associated with the at least one network device exceeding a threshold level.

3. The method of claim 1, further comprising basing the identifying of the set of problem prone device profiles on a sum of lengths of the service issues associated with a device profile exceeding a threshold level.

4. The method of claim 1, further comprising:
    providing preventative support to the at risk network device upon determining the at risk network device as being vulnerable to the service issue.

5. The method of claim 1, further comprising:
    providing a listing of device attributes associated with each device having a problem prone device profile;
    determining correlations between the device attributes of the listing and the service issue and between the common aspects of the problem prone device profile and the service issue;
    determining that a correlation between a particular device attribute of the listing of device attributes and the service issue is greater than any of the correlations between the common aspects of the problem prone device profile and the service issue; and
    identifying a set of problem prone device attributes from the listing of device attributes based on the determination that the particular device attribute is related to the service issue.

6. The method of claim 1, further comprising deriving the service reports from service repair requests.

7. A method comprising:
    accessing device data received from a plurality of devices, the device data including a device profile for each device and device attribute data including associations between devices and device attributes;
    accessing service reports;
    associating the device data with the service reports;
    identifying a service issue trend based on a common aspect of the device data associated with the service reports, the common aspect including at least one common device attribute shared by at least two of the service reports;
    identifying, by a processing device, at least one at risk device susceptible to future service issues based on the service issue trend by determining that the at least one at risk device is also associated with the at least one common device attribute related to the service issue trend, wherein the at least one at risk device has not reported a service report associated with the service issue trend;
    providing preventative support to the identified at least one at risk device;
    determining that the device data and the service reports lack a joinable data element;
    introducing at least one linking data set; and
    determining the associations between devices and service issues based on a comparison between the device data and the service reports using the at least one linking data set.

8. The method of claim 7, further comprising:
    relating the service issue trend to at least one device profile;
    generating a set of problem prone device profiles from the at least one device profile; and
    utilizing an association between a problem prone device profile and a device in the identifying at least one at risk device.

9. The method of claim 7, further comprising:
    generating a set of problem prone device attributes from the particular device attribute; and
    utilizing an association between a problem prone device attribute and a device in the identifying at least one at risk device.

10. The method of claim 7, further comprising basing the identifying service issue trend on a sum of the service reports associated with a device exceeding a threshold level.

11. The method of claim 7, further comprising basing the identifying service issue trend on a sum of the lengths of the service issues associated with a device exceeding a threshold level.

12. The method of claim 7, further comprising deriving the service reports from service repair requests.

13. A system, comprising:
    at least one database configured to store service reports, device data, and device attribute data; and
    a report processor communicatively coupled to the at least one database, the report processor configured to:
        associate the device data with the service reports,
        identify a service issue trend based on a common aspect of the device data associated with the service reports, the common aspect including at least one common device attribute shared by a at least two of the service reports,
        identify at least one at risk device susceptible to future service issues based on the service issue trend by determining that the at least one at risk device is also associated with the at least one common aspect related to the service issue trend, wherein the at least one at risk device is not known by the report processor to have experienced a particular service issue associated with the service issue trend,
        provide preventative support to the identified at least one at risk device;

determining that the device data and the service reports lack a joinable data element;

introducing at least one linking data set; and determining the associations between devices and service issues based on a comparison between the device data and the service reports using the at least one linking data set.

14. The system of claim 13, wherein the service issue trend is related to problem prone device profiles and the at least one at risk device is identified based on an association between a problem prone device profile and a device.

15. The system of claim 13, wherein the service issue trend is related to problem prone device attributes and at least one at risk device is identified based on an association between at least one problem prone device attribute and a device.

16. The system of claim 13, wherein the service issue trend is based on a sum of the service reports associated with a device exceeding a threshold level.

17. The system of claim 13, wherein the service reports include a length of a service issue, and wherein the service issue trend is based on a sum of the lengths of the service issues associated with a device exceeding a threshold level.

\* \* \* \* \*